United States Patent

Peters et al.

[11] Patent Number: 5,825,837
[45] Date of Patent: Oct. 20, 1998

[54] EXTRACTION TOOL FOR PARTIAL LENGTH FUEL RODS IN NUCLEAR FUEL ASSEMBLIES

[75] Inventors: William C. Peters, Wilmington; Harold B. King, Wrightsville Beach; David G. Smith, Leland, all of N.C.

[73] Assignee: General Electric Company, Schenectady, N.Y.

[21] Appl. No.: 613,663

[22] Filed: Mar. 11, 1996

[51] Int. Cl.⁶ .................................................. G21C 19/105
[52] U.S. Cl. ......................... 376/261; 376/271; 294/100; 294/906
[58] Field of Search ..................................... 376/261, 271, 376/268, 264, 451; 294/86.32, 100, 906

[56] References Cited

U.S. PATENT DOCUMENTS

| 4,297,776 | 11/1981 | Fogg | 376/261 |
| 4,539,174 | 9/1985 | Patenaude | 376/261 |
| 4,715,111 | 12/1987 | Kapoor et al. | 376/271 |
| 5,280,508 | 1/1994 | Okashima et al. | 376/261 |

*Primary Examiner*—Daniel D. Wasil
*Attorney, Agent, or Firm*—Nixon & Vanderhye P.C.

[57] ABSTRACT

An extraction tool for removing a partial length fuel rod from a fuel bundle assembly, wherein the partial length fuel rod has an upper end plug, the tool comprising an extension rod having a pair of gripper jaws mounted at one end thereof, the gripper jaws shaped and sized to engage the upper end plug; and a locking tube slidably received over the extension rod and engageable with the gripper jaws to lock the gripper jaws to the upper end plug.

10 Claims, 3 Drawing Sheets

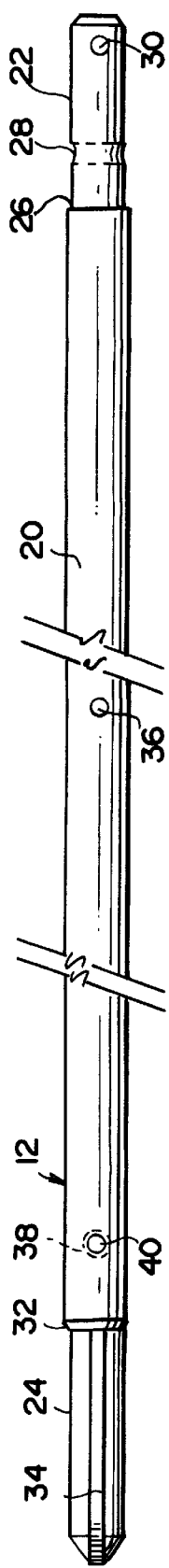
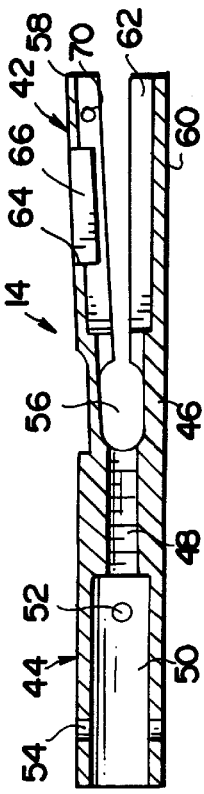
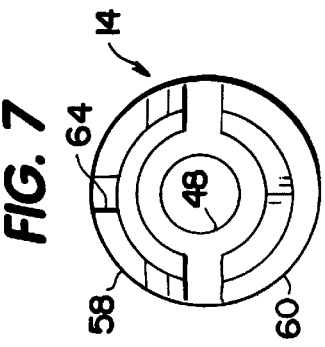
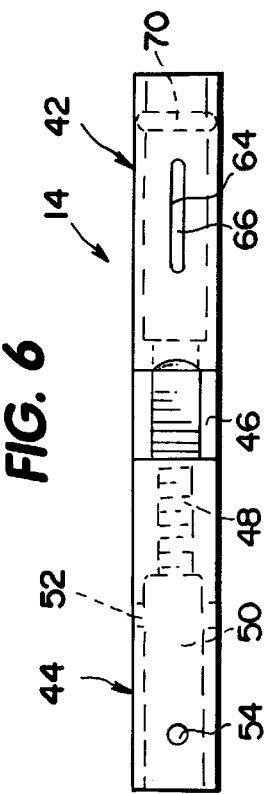

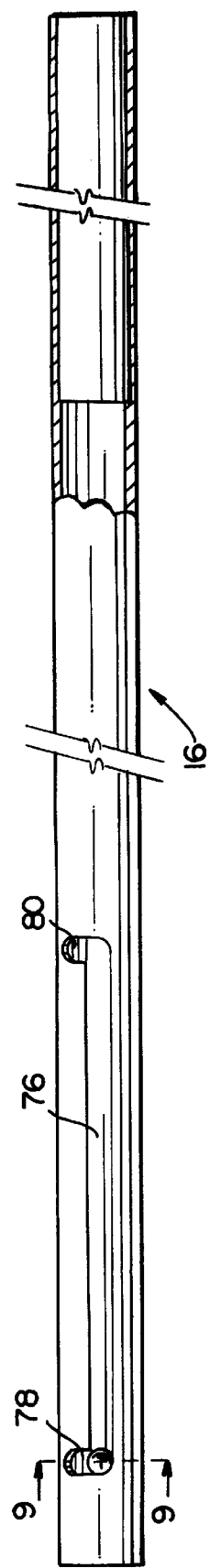
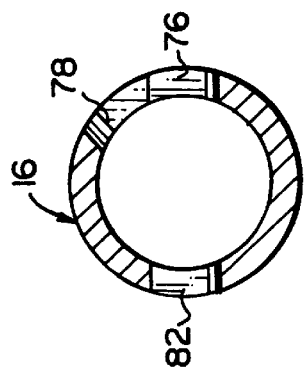

EXTRACTION TOOL FOR PARTIAL LENGTH FUEL RODS IN NUCLEAR FUEL ASSEMBLIES

TECHNICAL FIELD

This invention relates generally to nuclear reactor fuel bundle assemblies, and particularly to an extraction tool for removing a partial length fuel rod from a fuel bundle.

BACKGROUND

Nuclear fuel bundle assemblies in boiling water nuclear reactors typically include a plurality of fuel rods and one or more water rods extending between upper and lower tie plates. A plurality of fuel rod spacers are generally located along the length of the bundle to provide lateral support and to maintain desired spacing between the fuel rods. Some bundles also include one or more partial length fuel rods which terminate short of the upper tie plate. See, for example, U.S. Pat. Nos. 5,245,643; 5,229,068; 5,219,519; 5,164,155; 5,112,570; 5,091,146 and 5,017,332.

Occasionally, it is necessary to remove one or more of the partial length fuel rods from a partly or completely assembled nuclear fuel assembly. However, partial length rods in completed nuclear fuel assemblies are not readily accessible since they are internal to the assemblies, and since full length rods and one or more spacers usually extend several feet above the upper end plugs of the partial length rods. In addition, partial length rods are held in place by one or more spacers and are usually fabricated with threaded lower end plugs which screw into the lower tie plate. Typically, partial length rods are designed with special upper end plugs which permit removal with an appropriately designed extraction tool. Nevertheless, the prior tools have not been satisfactory in all respects.

DISCLOSURE OF THE INVENTION

The object of this invention is to provide a less expensive but nevertheless reliable tool which permits easy and quick removal or insertion of partial length fuel rods in a partly or fully assembled fuel bundle assembly. The design of the tool provides the following advantageous features:

1. The tool can be inserted and removed from the fuel assembly without damaging any of the assembly components, including the partial rod end plug, the fuel bundle spacers, other fuel rods in the assembly and, if applicable, the upper tie plate of the fuel bundle.
2. The tool can connect onto the partial length fuel rod's upper end plug so that it can be used to rotate the rod and seat or unseat the threaded lower end plug from the lower tie plate.
3. The tool can lock onto the partial rod's upper end plug so that it can be used to lift the rod from the fuel assembly. The pulling force required for removal of the partial rod can range from 10 to as much as 60 or 70 pounds. The tool can also be released from the upper end plug so that it can be used to replace an already removed rod.

In the exemplary embodiment, the extraction tool is fabricated with an inner extension rod secured to an axially aligned gripper having heat treated gripper jaws sheathed within an outer locking tube. Initially, the locking tube is moved to close the gripper jaws to preclude interference of the latter with the fuel rod spacers during initial insertion of the tool into the fuel bundle. The tool is inserted into the fuel assembly at the top, and slides through the upper fuel assembly spacers until it contacts the upper end plug of the partial length rod which is to be removed or reinstalled into a fuel bundle assembly. With the locking tube retracted, the gripper jaws can be closed over the upper end plug, and then locked into place when the locking tube is moved back down towards the end plug, over the jaws causing the latter to close. When locked in place, the extraction tool and particularly the inner extension rod can be turned to unscrew the fuel rod from the lower tie plate, and can then be lifted, along with the partial rod, out of the fuel bundle assembly by pulling on the inner extension rod. In reverse fashion, the tool can be used to reinstall the fuel rod in the fuel bundle assembly since the jaw locking mechanism can be disengaged by counter-rotation of the locking tube (releasing the locking pin) and subsequent retraction of that tube. After disengagement, the locking tube is moved back over the gripper jaw to close the latter and thus facilitate removal of the tool from the bundle.

Accordingly, in its broader aspects, the present invention relates to an extraction tool for removing a fuel rod from a fuel bundle assembly, wherein the fuel rod has an upper end plug, the tool comprising an extension rod having a pair of gripper jaws mounted at one end thereof, the gripper jaws shaped and sized to engage the upper end plug; and a locking tube slidably received over the extension rod and engageable with the gripper jaws to lock the gripper jaws to the upper end plug, wherein the extension rod and the locking tube include cooperable, engageable elements which permit the extension rod and locking tube to be rotated together, and further wherein the cooperable engageable elements include a slot in said locking tube and at least one pin on the extension rod projecting into the slot.

In another aspect, the invention relates to an extraction tool for removing a fuel rod threadably secured to a lower tie plate of a fuel bundle assembly comprising an elongated rod carrying a gripper mechanism at a forward end thereof, the gripper mechanism including a pair of gripper jaws normally held in an open position; a tubular actuator slidably receivable over the elongated rod to close the pair of gripper jaws about an end fitting of the fuel rod; and means for unthreading the fuel rod from the lower tie plate.

Other objects and advantages of the subject invention will become apparent from the detailed description which follows.

BRIEF DESCRIPTION OF THE DRAWINGS

FIG. 3 is a side elevation of an extension rod component of the extraction tool shown in FIGS. 1 and 2;

FIG. 4 is a partial section illustrating a keyway in the extension rod shown in FIG. 3;

FIG. 5 is a side section of a gripper jaw mechanism component which forms part of the extraction tool shown in FIGS. 1 and 2;

FIG. 6 is a plan view of the gripper jaw mechanism illustrated in FIG. 5;

FIG. 7 is a front end view of the gripper jaw mechanism shown in FIG. 5, but with the jaws shown in closed position and with an axially extending key removed for clarity;

FIG. 8 is a partial side elevation for the locking tube of the tool shown in FIGS. 1 and 2; and FIG. 9 is a cross-section taken along the line 9—9 of FIG. 8.

BEST MODE FOR CARRYING OUT THE INVENTION

Figure 1:
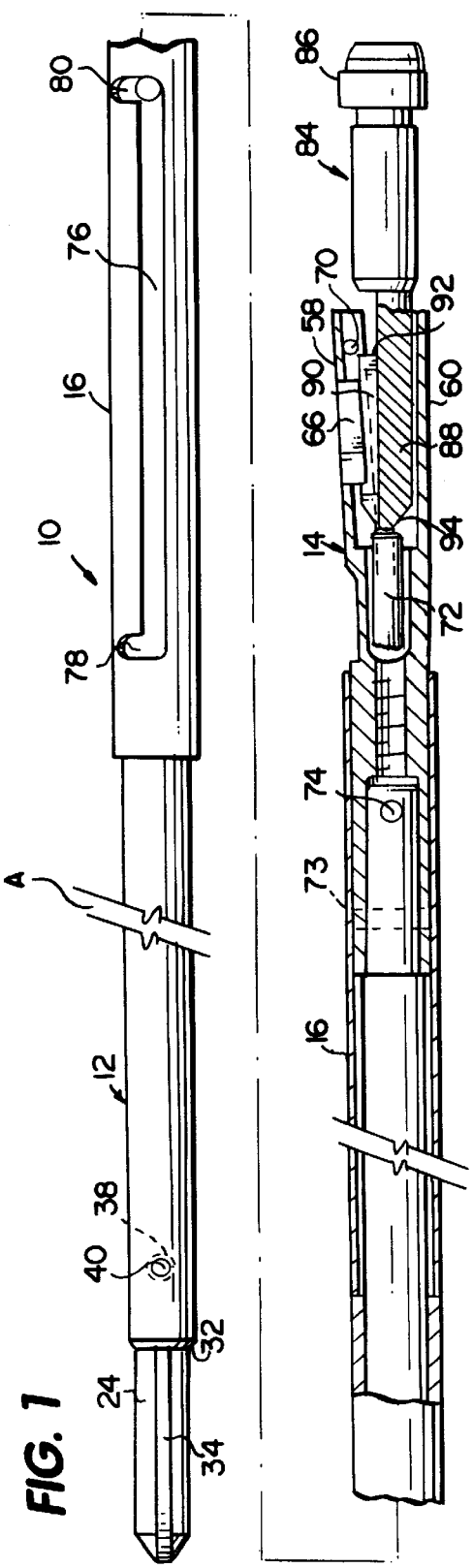
FIG. 1 is a side elevation, partly in section, of an extraction tool in accordance with this invention, in an open or unlocked position.
Figure 2:
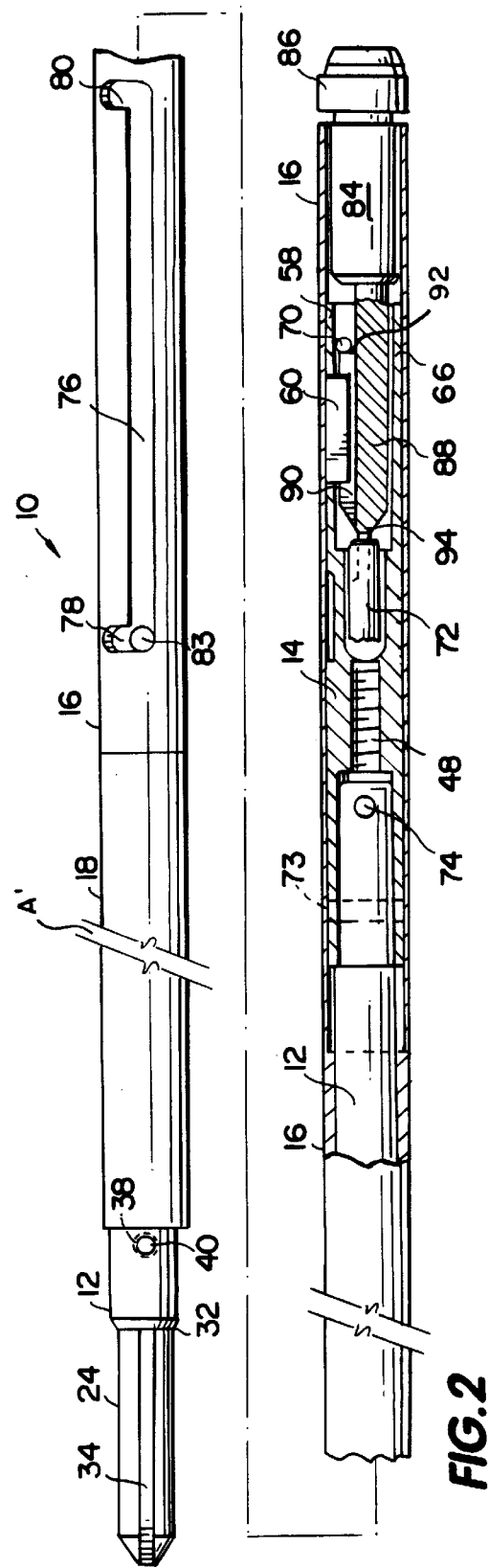
FIG. 2 is a view similar to FIG. 1 but with the extraction tool shown in a closed or locking position.

With reference initially to FIGS. 1 and 2, the extraction tool 10 in accordance with this invention generally includes an extension rod 12 axially connected to a gripper mechanism 14. An outer locking tube 16 is slidably received over the extension rod and gripper assembly, and may also include an extender or spacer tube 18. Each of these components will be described individually below.

With reference now also to FIG. 3, the extension rod 12 includes a main body portion 20, a reduced diameter forward portion 22 and a reduced diameter rearward portion 24. The forward portion 22 interfaces with the main body portion 20 at a radial shoulder 26. The forward portion 22 is also formed with a pair of transverse, mutually perpendicular and axially spaced holes 28, 30, the purpose for which will be described further hereinbelow.

The rearward portion 24 interfaces with the main body portion 20 at a beveled shoulder 32, and is formed with an axially extending keyway 34 (see also FIG. 4) with a length substantially equal to the length of the rearward portion 24. The latter, along with keyway 34, facilitates insertion and removal of the tool by remote controlled apparatus which is otherwise not part of the present invention.

The main body portion 20 is uniformly cylindrical throughout its length, and also includes a transverse hole 36 and a transverse socket or recess 38 which receives a conventional spring loaded ball plunger 40.

Turning now to FIGS. 5–7, the gripper mechanism 14 comprises a tubular member having forward and rearward axial sections 42, 44, respectively, connected by a relieved top portion 46. The rearward section 44 has a relatively small diameter, threaded bore 48, connected to a relatively larger diameter counterbore 50 provided with a pair of transverse, mutually perpendicular holes 52, 54. The threaded bore 48 opens through an oval window 56. The forward section 44 of the gripper 14 is split axially to form a pair of flexible jaws 58, 60 with section 42 counterbored at 62 substantially to the recess 56. Except for the axial portion corresponding to the threaded bore 48, the radial wall thickness of the various sections of the gripper is substantially uniform, with the thickness at the relieved portion 46 less than at the remaining axial portions of the gripper.

Jaw 58 is provided with an elongated slot 64, located mid-way along the length of the jaw for receiving an elongated key 66 which can be brazed or otherwise suitably secured within the slot 64. Forward of the key 66, there is a transverse hole which receives a dowel pin 70 extending through the jaw 58 perpendicular to the longitudinal axis of the tool. With the above described arrangement, jaw 58 can be flexed outwardly to the orientation shown in FIG. 5—making an included angle of about 3° to a longitudinal axis through the gripper 14. The jaws are fixtured and then heat treated in the illustrated (open or non-locking) position. In this way, the jaw 58 is normally biased to the open position, but can be compressed or squeezed to a closed position, as described further below.

A set screw 72 (see FIGS. 1 and 2) is subsequently threaded into the bore 48, the forward end thereof extending forwardly beyond the window 56 and into a space between the jaws 58, 60 where it forms a stop for longitudinal movement of the tool relative to the upper end plug of the partial length fuel rod to be removed, as also explained in greater detail below. The gripper 14 is telescoped over the forward end 22 of the rod 12, and a pair of dowels 73, 74 are inserted through aligned holes 28, 54 and 30, 52, respectively, which are then brazed to create a fixed rigid joint between the rod 12 and the gripper 14.

With reference again to FIGS. 1 and 2, as well as FIGS. 8 and 9, the locking tube 16 is formed with an elongated, axially directed slot 76 which terminates at opposite circumferentially directed locking recesses 78, 80 which extend transversely in the same circumferential direction. A transverse hole 82 is drilled in the tube 16, at a location diametrically opposed to the rearward end of slot 76 as shown in FIGS. 8 and 9. The slot 76 is located toward the rearward end of the locking tube 16 and functions as described in detail below. The locking tube 16 is sized to be slidably received over the extension rod 12, with a dowel pin 83 then inserted through hole 36 and projecting into the slot 76. The pin is then fixed, as by brazing, such that the tube 16 is free to slide along the rod 12 to an axial extent permitted by the length of the slot 76.

The extender tube 18 may then be slidably received over the extension rod 12, with its forward end in abutting engagement with the trailing end of tube 16. If used, the rearward end of the extension tube 18 engages the ball plunger 40 as best seen in FIG. 2. Tube 18 thus prevents undesirable axial sliding of the locking tube 16 when the latter is not otherwise locked to the rod 12.

The manner of operation of the device will now be described. In order to fully understand the operation of the extraction tool assembly 10, however, it will be helpful to first describe the structural features of the end plug 84 which is secured to the upper end of the partial length fuel rod (not shown). The end plug 84 includes a lower end portion which includes a conventional partial length fuel rod engaging boss 86 and an upper extraction tool engaging portion 88. The latter is formed with an axially extending keyway or channel 90 which is adapted to receive the key 66 on the gripper jaw 58. This keyway is interrupted approximately midway along the axial length of the end plug, thereby creating a radial shoulder 92 engageable by the pin 70 when the jaw 58 is moved to its closed position. The upper portion of the end plug 84 is formed with a flat tip 94 which is adapted for engagement with the set screw 72 as discussed hereinabove.

Initially, the extraction tool assembly 10 is inserted into the fuel bundle assembly with the locking jaw 16 moved downwardly over the gripper mechanism 14 so that the jaws 58, 60 are closed. This permits easy insertion of the extraction tool assembly 10, and precludes any interference by the gripper mechanism with, for example, the fuel rod spacers located above the partial length fuel rod to be removed. The extraction tool assembly 10 is inserted to a location axially adjacent the upper end plug 84 and the locking tube 16, along with extender tube 18 (if used), are axially retracted so as to expose the gripper mechanism 14 and allow the jaw 58 to spring outwardly to its open position as shown in FIG. 1. The tool assembly 10 is then further moved in an axial direction until the tip 94 of the end plug 84 engages the preadjusted set screw 72. The locking tube 16 is then moved in the opposite direction so that the locking tube 16 moves over the gripper mechanism 14, causing the jaw 58 to engage the end plug 84, with the key 66 moving into the keyway 90, and with the transverse pin 70 engaging the shoulder 92. With respect to the sequence shown in FIGS. 1 and 2, it will be appreciated that the length of the break at A in FIG. 1 is not the same as the length of the break at A' in FIG. 2. In other words, the distance from the trailing edge of locking tube 16 to, for example, the ball plunger 40, is quite obviously not the same in both Figures.

Once the extraction tool is fully engaged as described above, the inner extension rod 12 may be rotated to unscrew the partial length fuel rod from the lower tie plate. During initial rotation, the pin 83 moves into the recess 78. After the partial length rod is free of the lower tie plate, the extraction tool assembly may be pulled, via the inner extension rod 12, from the fuel bundle assembly, carrying the partial length fuel rod along with it. It should be noted here, that the purpose of the recess 80 at the forward end of the slot 76 is simply to prevent the locking tube 16 from moving axially along the extender rod 12, when the tube 16 is in its retracted position.

It will be appreciated that for reinsertion of a partial length fuel rod, the procedure described above is essentially reversed, recognizing that once the fuel rod has been properly located, the locking tube 16 (and the extender tube 18, if used) will be retracted, allowing the jaw 58 to disengage from the partial length fuel rod end plug 84. Once the extraction tool has been moved axially to a position adjacent the end plug 84, the locking tube 16 may be again moved over the gripper jaw mechanism 14 to close the jaws 58, 60 and thereby preclude any interference of the gripper jaws with other components of the fuel assembly, particularly the fuel rod spacers, during extraction of the tool.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An extraction tool for removing a fuel rod from a fuel bundle assembly, wherein the fuel rod has an upper end plug, the tool comprising:

an extension rod having a pair of gripper jaws mounted at one end thereof, said gripper jaws shaped and sized to engage the upper end plug; and a locking tube slidably received over said extension rod and engageable with said gripper jaws to lock said gripper jaws to the upper end plug, wherein said extension rod and said locking tube include cooperable, engageable elements which permit the extension rod and locking tube to be rotated together, and further wherein said cooperable engageable elements include a slot in said locking tube and at least one pin on said extension rod projecting into said slot.

2. The extraction tool of claim 1 wherein said pair of gripper jaws are formed as a unitary member secured at a forward end of said extension rod, at least one of said jaws normally in an open position.

3. The extraction tool of claim 2 wherein said at least one gripper jaw is heat treated in the open position.

4. The extraction tool of claim 3 wherein said locking tube is slidable over said gripper jaws to thereby cause said at least one gripper jaw to move to a closed position.

5. The extraction tool of claim 1 wherein at least one of said gripper jaws is formed with an elongated key.

6. The extraction tool of claim 2 wherein said unitary member includes a threaded bore opening into a space between said gripper jaws, and a set screw threadably received in said threaded bore, and adapted to project into a space between said jaws.

7. The extraction tool of claim 2 wherein said unitary member includes a rearward portion and a forward portion including said gripper jaws, said forward and rearward portions separated by a center section having a relieved portion on an exterior surface thereof and an internal threaded bore.

8. The extraction tool of claim 7 wherein a set screw is received in said threaded bore, and projects into a space between said jaws.

9. The extraction tool of claim 1 and further including an extension tube slidably received over said extension rod, axially behind said locking tube.

10. An extraction tool for removing a partial length fuel rod from a fuel bundle assembly, wherein the fuel rod has an upper end plug, the tool comprising:

an extension rod having a pair of gripper jaws mounted at one end thereof, said gripper jaws shaped and sized to engage the upper end plug; and a locking tube slidably received over said extension rod and engageable with said gripper jaws to lock said gripper jaws to the upper end plug, wherein said locking tube is formed with an elongated, axially extending slot having transverse recesses formed at opposite ends thereof, and wherein said extension rod is provided with a pin which rides in said slot.

* * * * *